United States Patent
Konishi et al.

[11] 3,977,827
[45] Aug. 31, 1976

[54] PROCESS FOR DYEING ACID-MODIFIED POLYESTER FIBERS

[75] Inventors: Seizo Konishi, Minoo; Koichi Ishii, Kobe; Sadaharu Abeta, Toyonaka; Tetuo Okaniwa, Minoo, all of Japan

[73] Assignee: Sumitomo Chemical Company, Limited, Osaka, Japan

[22] Filed: Feb. 4, 1975

[21] Appl. No.: 546,978

[30] Foreign Application Priority Data
Feb. 25, 1974 Japan................ 49-22660

[52] U.S. Cl.................. 8/41 C; 8/21 C; 8/37; 8/163; 8/179
[51] Int. Cl.² .............. C09B 27/00; D06P 1/02
[58] Field of Search ....................... 8/41 C

[56] References Cited
UNITED STATES PATENTS

| | | | |
|---|---|---|---|
| 3,504,997 | 4/1970 | Clapham | 8/21 R |
| 3,874,847 | 4/1975 | Ohkawa et al. | 8/41 C |

FOREIGN PATENTS OR APPLICATIONS

| | | |
|---|---|---|
| 728,033 | 7/1969 | Belgium |
| 2,129,271 | 12/1971 | Germany |
| 15,791 | 4/1971 | Japan |
| 787,369 | 12/1957 | United Kingdom |
| 786,929 | 11/1957 | United Kingdom |

Primary Examiner—Joseph L. Schofer
Assistant Examiner—A. L. Clingman
Attorney, Agent, or Firm—Sughrue, Rothwell, Mion, Zinn and Macpeak

[57] ABSTRACT

A process for dyeing acid-modified polyester fibers comprising contacting the fibers with a dye bath containing a thiazoleazo-type cationic dye of the formula (I),

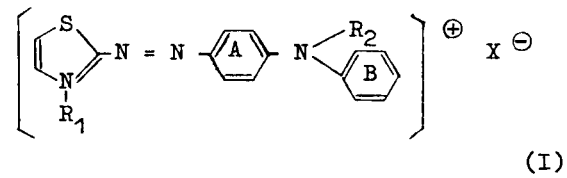

(I)

wherein $R_1$ and $R_2$ each is a methyl group or an ethyl group; A and B each is a benzene nucleus which can be substituted with a methyl group, an ethyl group, a methoxy group or an ethoxy group; and $X^-$ is an anion. The cationic dye compounds of the formula (I) dye acid-modified polyester fibers a bright blue shade and with good light fastness.

7 Claims, No Drawings

PROCESS FOR DYEING ACID-MODIFIED POLYESTER FIBERS

BACKGROUND OF THE INVENTION

1. Field of the Invention

The present invention relates to a method for dyeing acid-modified polyester fibers with a cationic dye bath containing a specific thiazoleazo cationic dye.

2. Description of the Prior Art

Of the various synthetic fibers available, the demand for polyester fibers increases every year due to the superior properties of polyester as a fiber. Polyester fiber is rendered dyeable with a cationic dye by modifying the fiber with acidic substances, as disclosed in, for example, Japanese Patent Publication No. 10497/59. Acid-modified polyester fibers, as disclosed hereinbefore and in U.S. Pat. No. 3,018,272 are well-known. For cationic dyes for acid-modified polyester fibers, it is, of course, possible to dye the fibers a brilliant shade which is a characteristic of a cationic dye. Moreover, cationic dyes for acid-modified polyester fibers must also have the following properties superior to the properties of conventional cationic dyes:

i. higher fastness to light on the acid-modified polyester fiber, ii. less decomposition during high temperature dyeing, iii. good compatibility with other dyes of different shade (the same dyeing rate), and iv. less staining of or less decomposition due to other fibers, such as wool or regular polyester fibers, frequently used in blends with acid-modified polyester fibers.

As disclosed in German Offenlegungsschrift No. 2,129,271 and Belgian Pat. No. 728,033, it is well-known that thiazoleazo-type cationic dyes can be applied to acid-modified polyester fibers. On the other hand, it is also well-known that dyes having a structure similar to the present dyes can be advantageously applied to acrylic fibers, as disclosed in Japanese patent publication No. 15791/71, Netherlands specification No. 6,608,698 and British Pat. No. 787,369 in addition to the above German and Belgian patents. However, these dyes which are useful for dyeing acrylic fibers are not necessarily useful for dyeing acid-modified polyester fibers because the dyes, particularly the blue dyes thereof, provide dyeings having a lower fastness to light on an acid-modified polyester fiber than on an acrylic fiber, and, moreover, the dyes should be applied to the fiber using high temperature dyeing (about 110° to 130°C) or carrier dyeing under more severe conditions than the conditions of 90° to 100°C used with an acrylic fiber.

Therefore, the dyes must have higher fastness to light and higher stability to high temperatures than is required for acrylic fibers, i.e., in order for the dyes to be applied to acid-modified polyester fibers.

An acid-modified polyester fiber is more frequently used in blends with other fibers, such as wool, other types of polyesters, polyamides or celluloses, than is an acrylic fiber, and the effects of these fibers used in the blends on the cationic dyes during dyeing cannot be ignored. For example, the dyes are sometimes decomposed by a reductive group present in the blend of fibers.

The dyeing of acid-modified polyester fibers using thiazoleazo-type blue dyes has been studied, and it has been found that blue dyes are exhausted so much faster than the other cationic dyes of different shades that level dyeings do not result and these dyes are not suitable for combination dyeing. In addition, it was found that the same phenomenon was also observed when these dyes were applied to acrylic fibers in trichromatic dyeing as one of the three primary colors compatible with each other.

In addition, it was found that dyeings of lower fastness to light on an acid-modified polyester fiber resulted than on an acrylic fiber. These factors are, of course, due entirely to the differences between acrylic fibers and acid-modified polyester fibers.

It is clear from the above that conventionally employed thiazoleazo-type blue dyes cannot be used satisfactorily as a dye for acid-modified polyester fibers.

SUMMARY OF THE INVENTION

As a result of research on new thiazoleazo-type blue dyes for acid-modified polyester fibers having desirable fastness and dyeing properties, it has now been found that the specific dye compounds of the formula (I) below have very good properties and can be used in a dyeing process for acid-modified polyester fibers.

Thus, this invention provides a process for dyeing acid-modified polyester fibers with a cationic dye which comprises contacting the polyester fibers with a dye bath containing at least one thiazoleazo-type cationic dye represented by the following formula (I),

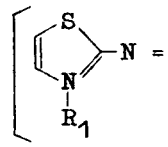

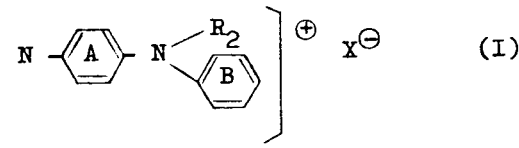

wherein $R_1$ and $R_2$ each is a methyl group or an ethyl group; A and B each is a benzene nucleus which can be substituted with a methyl group, an ethyl group, a methoxy group or an ethoxy group; and $X^-$ is an anion.

DETAILED DESCRIPTION OF THE INVENTION

The present dyes of formula (I) give acid-modified polyester fibers an incomparably more brilliant blue shade than that obtained with other thiazoleazo-type cationic dyes, for example, similar Dyes (a), (b), (c), (d) and (e) in Table 1 shown hereinafter, and moreover the dyes of formula (I) are very stable in a high temperature dye bath, superior in diffusibility into the fibers to be dyed and result in little or no staining of other fibers which are present together in the dye bath. Furthermore, since the present dyes of formula (I) dye acid-modified polyester fibers at a moderate dyeing rate and have good compatibility with other general purpose cationic dyes of different shades (for example, C.I. Basic Yellow 31, C.I. Basic Red 46, and the Dye (f) shown below), the so-called combination dyeing becomes possible. Therefore, the present dyes can be employed in a wide variety of dyeing methods.

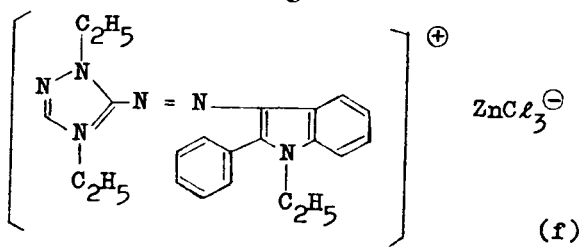

It is interesting to note that no attention at all has been paid to the use of the present thiazole-type dyes of the formula (I) as dyes for acrylic fibers since dyeings of acrylic fibers cannot be obtained with characteristic brilliancy as well as good fastness to wet heat, and, further, since the rate of dyeing of the present dyes of the formula (I) is low on acrylic fibers compared with other conventional cationic dyes, it is very difficult to carry out combination dyeing of acrylic fibers with good reproducibility. In contrast, the present thiazole-type dyes of the formula (I) are incomparably superior to other cationic dyes of the same type in the characteristic brilliancy on acid-modified polyester fibers. Therefore, the present dye compounds of the formula (I) have the advantage that they provide level and bright dyeings on both acid-modified polyester fibers and blends of the acid-modified polyester fibers with reductive fibers.

Moveover, the present dye compounds of the formula (I) can advantageously be used not only individually and in combination, but also for dyeing acid-modified polyester fiber alone or blends of acid-modified polyester fiber with another fiber, such as wool, nylon, and cellulose blends. The dye compounds of the formula (I) can be said to be very valuable dyes having a wide range of application.

Suitable acid-modified polyester fibers which can be used in the present invention include, for example, Dacron T-92, Dacron T-64, Dacron T-65 and Dacron T-62 (a registered trade mark for such fibers sold by E. I. du Pont de Nemours and Co.).

The present dyes represented by the formula (I) can be obtained by 1. diazotizing 2-aminothiazole or a salt thereof according to usual methods,
2. reacting the resulting diazo compound with a diphenylamine of the formula (II),

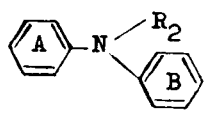

wherein $R_2$, A and B are the same as defined above, and then 3. reacting the resulting compound represented by the formula (III),

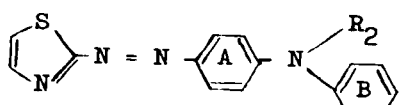

wherein $R_2$, A and B are the same as defined above, with an alkylating agent such as dimethylsulfate, diethylsulfate, methyl p-toluenesulfonate and ethyl p-toluenesulfonate, in water or an organic solvent such as a halogenated aromatic or aliphatic hydrocarbon, preferably in the presence of an alkali such as an oxide, hydroxide, carbonate or bicarbonate of an alkali metal or an alkaline earth metal.

When 2-aminothiazole which is used as a diazo component according to the present invention is replaced by 2-amino-6-alkoxybenzothiazole which is generally used for dyes for acrylic fibers, the dyes obtained [for example, dyes such as Dyes (d) and (e)] have a markedly reduced diffusibility into acid-modified polyester fibers regardless of the coupling components, resulting in the so-called ring dyeing with poor reproducibility and poor light fastness on dyeings.

On the other hand, when the present coupling components are replaced by an N,N-dialkylaniline or an N-alkyl-N-aralkylaniline (wherein the alkyl and aralkyl groups can be substituted with nonionic dissociable groups such as a hydroxyl group and a halogen atom), which are frequently used for dyes for acrylic fibers, the dyes obtained [for example, dyes such as Dyes (a), (b) and (c)] have a light-fastness which is too low for practical use.

Suitable examples of the anion, X, are chloride ion, bromide ion, iodide ion, hydroxyl ion, carbonate ion, bicarbonate ion, sulfate ion, bisulfate ion, perchlorate ion, phosphate ion, phosphomolybdate ion, phosphotungstate molybdate ion, oxalate ion, acetate ion, maleate ion, propionate ion, benzenesulfonate ion, or a complex ion such as, e.g., $ZnCl_3^-$. A chloride ion or $ZnCl_3^-$ is preferred for X.

Acid-modified polyester fibers can be dyed with the present dyes of the formula (I) at a bath temperature of about 110° to 130°C in a dyeing bath containing the present dyes of the formula (I) in an amount of about 0.1 to 5% o.w.f. In the process it is preferred to adjust the pH of the dyeing bath to about 3.5 to 5.0 with a buffer such as a sodium acetate-acetic acid buffer, a sodium phosphate-phosphoric acid buffer, etc., and in some cases sodium sulfate can be added to the dyeing bath to maintain the stability of the fiber.

A small amount of a cationic-type retarder such as a derivative of a higher fatty acid having from about 10 to 15 carbon atoms can be added to reduce the rate of dyeing, where desired. The present dyes of the formula (I) can be employed in carrier dyeing as well. Carrier dyeing is a well-known technique, for example, as disclosed in British Pat. No. 1,192,168. It is preferred, in this case, that the carrier be present at a level of about 5 to 20% o.w.f., the bath temperature be about 90° to 110°C and the pH of the bath be about 3.5 to 5.0. Preferred carriers are nonionic type carriers such as a biphenyl type nonionic carrier commercially available as Calorid ELF-C, produced by Tanatex Co., Ltd.

The present dyes of the formula (I) can advantageously be employed in the form of a higher aliphatic carboxylic acid salt thereof, for example, by mixture of the dyes of the formula (I) with an alkali metal salt, e.g., a sodium or potassium salt of a higher aliphatic carboxylic acid having about 10 to 15 carbon atoms, in a solvent dyeing process for the fiber together with a small amount of water (e.g., about 40 – 100% o.w.f.) and a halogenated hydrocarbon, for example, trichloroethylene, tetrachloroethylene, etc.

The present invention will be illustrated in greater detail with reference to the following examples, which are only given for the purpose of illustration and the invention is not to be interpreted as being limiting thereto. All parts in the examples are parts by weight, unless otherwise indicated.

EXAMPLE 1

In 500 parts of water was dissolved 0.03 part of a dye of the formula (I), Dye (1), Dye (1)

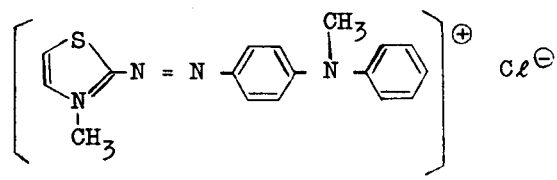

and the resulting solution was adjusted to a pH of 4 with an acetic acid-sodium acetate buffer to prepare a dye bath. In the dye bath were immersed 10 parts of Dacron T-92 knitted goods and the goods were dyed at 120°C for 40 minutes to obtain reddish blue dyeings which were fast to light and wet-treatment.

Dye (1) was completely exhausted onto the acid-modified polyester fibers from the high temperature bath with little or no decomposition. Furthermore, the exhausted dye completely diffused far into the fibers and good reproducibility was obtained between dyeing on an experimental basis and on a commercial basis.

In contrast to this, when a similar dye, Dye (d), in Table 1 shown hereinafter, was used in place of the present dye of the formula (I), Dye (1), the dye stability in a high temperature bath was very poor. When a similar dye, Dye (d) or Dye (e), was used instead, the diffusibility into the fibers was very poor and thus reproducible dyeings could not be obtained.

Furthermore, when a similar dye, Dye (a), Dye (b) or Dye (c), in Table 1 shown hereinafter, was used in place of the present dye of the formula (I), Dye (1), the dye stability in the high temperature bath was relatively good, although inferior to the present dye of the formula (I), Dye (1), and the diffusibility was also good, but the dyeings obtained had a light fastness which was too low for practical use.

EXAMPLE 2

| The following three dyes, | | part |
|---|---|---|
| Dye (1) | (used in Example 1) | 0.01 |
| Dye (f) | (described hereinbefore) | 0.01 |
| Dye (g) | | 0.01 |

Dye (f): Most frequently used commercial yellow dye
Dye (g): C.I. Basic Red 46; most frequently used red dye were mixed and dissolved in 500 parts of water, and then the resulting solution was adjusted to a pH of 4 with an acetic acid-sodium acetate buffer to prepare a dye bath. In the dye bath were immersed 10 parts of Dacron T-65 knitted goods and the goods were dyed at 120°C for 40 minutes. The knitted goods were dyed with a good uniformity a brown shade which was fast to light and wet-treatment.

The mutual compatibility among the three dyes, Dye (1), Dye (f) and Dye (g), was very superior, and thus the knitted goods were dyed a constant brown shade throughout the entire dyeing process. Since Dyes (f) and (g) have superior performance as a dye for acid-modified polyester fibers and are general purpose dyes, the good compatibility of the dyes of the formula (I) with these dyes, which means that combination dyeing with these dyes can be freely carried out, is one of the important characteristics of the present dyes of the formula (I).

When the present dye of the formula (I), Dye (1), was replaced by similar dyes, Dyes (a), (b), (c), (d) and (e) in Table 1 shown hereinafter, the compatibility with Dyes (f) and (g) was very poor, giving an unlevel dyeing.

EXAMPLE 3

A dyeing procedure was carried out in the same manner as described in Example 1, except that 10 parts of Dacron T-92 knitted goods were replaced by 20 parts of a 50 : 50 union fabric of Dacron T-92 and Tetoron (a registered trade mark for regular polyester fibers sold by Teijin, Ltd.). Thus, the Dacron T-92 portion was dyed to completely the same degree as obtained with 100% Dacron T-92 knitted goods with no staining on the Tetoron portion.

Even when the Tetoron portion of the union fabric was replaced by nylon 6 (produced by Toray Industries) or cotton, the present dye of the formula (I), Dye (1), gave no staining at all on the nylon or cotton similar to the lack of staining of the Tetoron.

When a commercial dye, Dye (e) shown hereinafter, was used in place of the present dye of the formula (I), Dye (1), Dye (e) gave a large degree of staining on Tetoron or nylon so that Dye (e) was found to be completely unsuitable for dyeing blends or unions of acid-modified polyester fibers with Tetoron or nylon.

EXAMPLE 4

In 500 parts of water was dissolved 0.02 part of the dye of the formula (I), Dye (2), Dye (2)

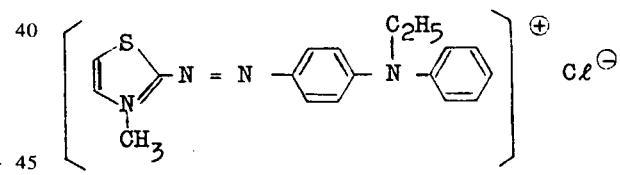

to prepare a dye bath, and then 10 parts of Dacron T-62 yarns were dyed in the dye bath in the same manner as described in Example 1. Thus, brilliant reddish blue dyeings having a high fastness to light and wet-treatment were obtain with a good uniformity.

EXAMPLE 5

In the same manner as described in Example 3, 10 parts of a 50 : 50 blended fabric of Dacron T-64 and cotton were dyed using 0.01 part of the dye of the formula (I), Dye (3), Dye (3)

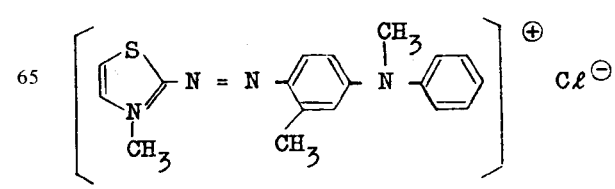

Thus, the Dacron T-64 portion was dyed a brilliant reddish blue shade, but the cotton portion was not stained at all and remained white.

Table 1 shows the dyeing results obtained with the present dyes of the formula (I) and dyes for comparison. Unless otherwise stated, the data in the table are those which were obtained by dyeing acid-modified polyester fibers in the same manner as described in Examples 1 to 3.

Dye (a)

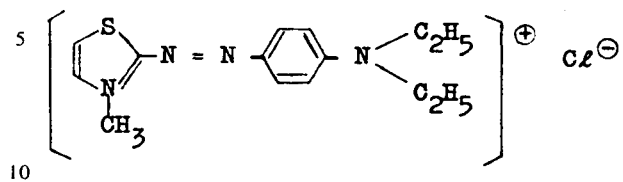

Table 1

| Dye | | Hot Water Stability (%) | | Staining (rating) | | Light-fastness (rating) (medium shade) | Diffusibility (%) |
| --- | --- | --- | --- | --- | --- | --- | --- |
| | | Medium Shade | Deep Shade | Wool | Tetoron | | |
| Formula (I) Dye: | (1) | 96 | 98 | 5 | 5 | 5 | 88 |
| | (2) | 95 | 97 | 5 | 5 | 5 | 85 |
| | (3) | 97 | 98 | 5 | 5 | 5 | 85 |
| | (4) | 95 | 98 | 5 | 5 | 5 | 83 |
| | (5) | 93 | 97 | 5 | 5 | 5 | 83 |
| Reference Dye: | (a) | 90 | 92 | 4 | 4 | 3–4 | 90 |
| | (b) | 88 | 91 | 4–5 | 4 | 3–4 | 83 |
| | (c) | 92 | 93 | 4–5 | 4 | 3–4 | 87 |
| | (d) | 83 | 85 | 4 | 4 | 4–5 | 34 |
| | (e) | 90 | 92 | 3 | 2 | 5 | 45 |

| Dye | | Shade | Compatibility | Potting on Acrylic Fibers | Remarks |
| --- | --- | --- | --- | --- | --- |
| Formula (I) Dye: | (1) | Reddish blue | Good | 1–2 | Dye used in Examples 1, and 3 |
| | (2) | Reddish blue | Fairly good | 1–2 | Dye used in Example 4 |
| | (3) | Reddish blue | Fairly good | 1–2 | Dye used in Example 5 |
| | (4) | Reddish blue | Fairly good | 1–2 | |
| | (5) | Blue | Fairly good | 1–2 | |
| Reference Dye: | (a) | Violet | Poor (dyeing rate faster) | 1–2 | |
| | (b) | Violet | Poor (dyeing rate slower) | 1–2 | |
| | (c) | Reddish blue | Poor (dyeing rate slightly faster) | 1–2 | |
| | (d) | Blue | Poor (dyeing rate very faster) | 4 | |
| | (e) | Blue | Poor (dyeing rate faster) | 2–3 | |

Note:

Dye (4)

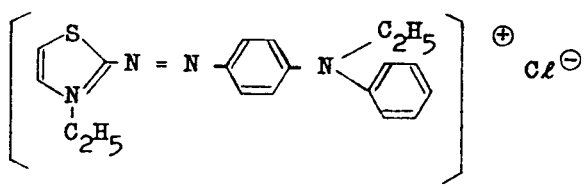

Dye (b)

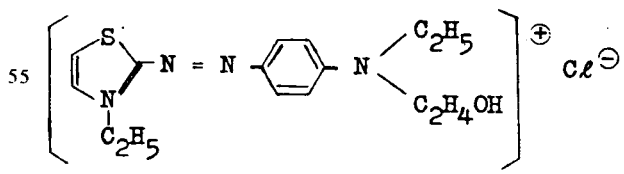

Dye (5)

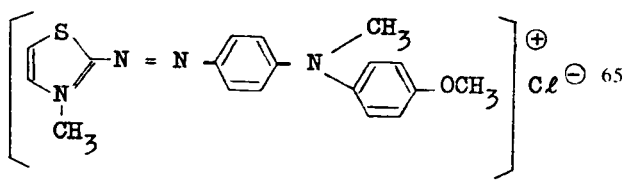

Dye (c)

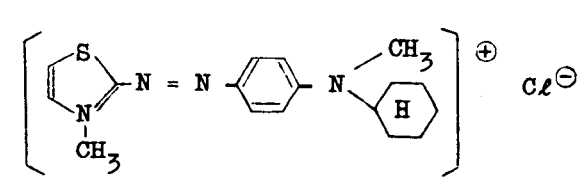

Dye (d)

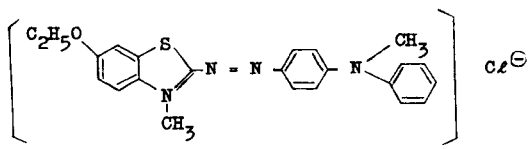

Dye (e)

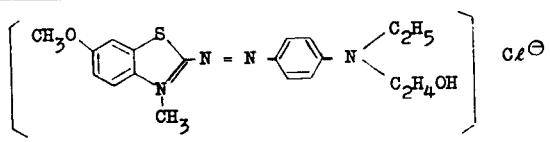

Hot Water Stability Test

The dye solutions adjusted to a pH of 4.4 and containing 0.02 g/l (for a medium shade) and 0.2 g/l (for a deep shade) of the dye were heated at 120°C for 40 minutes, and the stability was expressed by a ratio of absorption maxima of the solution before and after heating.

Staining Test

The staining evaluation was carried out by means of the gray scale for staining according to JIS L - 0805.

Lightfastness Test

The lightfastness test was carried out according to the carbon arc method of JIS L - 0842.

Diffusibility Test

The diffusibility was expressed by a diffusion percentage of the dye into Dacron T-65 at 120°C for 40 minutes.

Potting Fastness Test on Acrylic Fibers

The test was carried out according to JIS L - 0875.

Compatibility Test

The compatibility was evaluated according to the degree of compatibility in combination dyeing together with Dyes (f) and (g).

As can be seen from the results in Table 1, the dyes according to the present invention of the formula (I) have a potting fastness rating as low as 1 – 2 similar many other reference dyes, and so they have no practical value as a dye for acrylic fibers. While, on dyeing acid-modified polyester fibers, the present dyes are markedly superior in stability in hot water, compatibility, staining and lightfastness, and moreover the diffusibility is also sufficient for practical use.

As described in detail, it can be said that the dyes according to the present invention of the formula (I) are quite superior as blue dyes for acid-modified polyester fibers. On the other hand, the reference dyes have fatal defects in some points even though they are superior in other points and therefore they are unsatisfactory in dyeing acid-modified polyester fibers.

While the invention has been described in detail and with reference to specific embodiments thereof, it will be apparent to one skilled in the art that various changes and modifications can be made therein without departing from the spirit and scope thereof.

What is claimed is:

1. A process for dyeing acid-modified polyester fibers with a cationic dye, comprising contacting said polyester fibers with a dye bath containing a cationic dye compound of the formula (I),

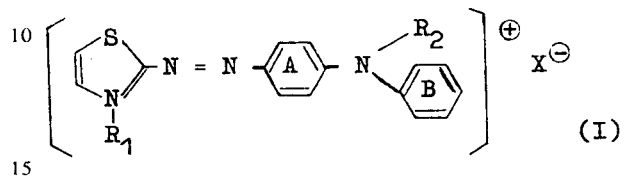

wherein $R_1$ and $R_2$ each is a methyl group or an ethyl group; A and B each is a benzene nucleus which can be substituted with a methyl group, an ethyl group, a methoxy group or an ethoxy group; and $X^-$ is an anion.

2. The process according to claim 1, wherein said dye bath is at a temperature of from about 110° to 130°C.

3. The process according to claim 1, wherein the dyeing is carried out in a dye bath additionally containing a non-ionic type carrier.

4. The process according to claim 1, wherein said compound of the formula (I) is

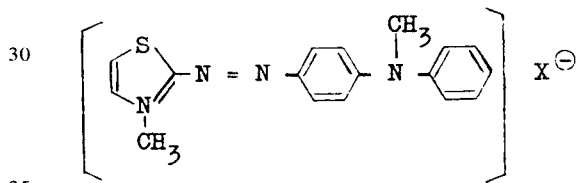

wherein $X^-$ is an anion.

5. The process according to claim 1, wherein said compound of the formula (I) is

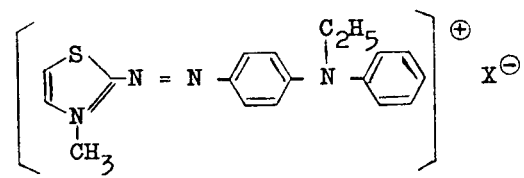

wherein $X^-$ is an anion.

6. The process according to claim 1, wherein said compound of the formula (I) is

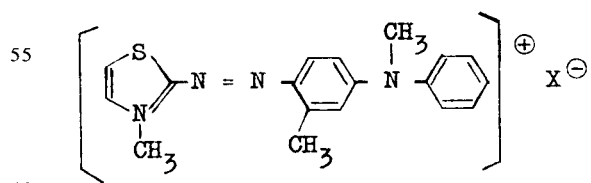

wherein $X^-$ is an anion.

7. An acid-modified polyester fiber dyed according to the process of claim 1.

* * * * *